US012641345B2

(12) United States Patent     (10) Patent No.:   US 12,641,345 B2

Galor Gluskin et al.     (45) Date of Patent:    May 26, 2026

(54) IMAGE SENSOR WITH MULTIPLE IMAGE READOUT

(71) Applicant: QUALCOMM Incorporated, San Diego, CA (US)

(72) Inventors: Micha Galor Gluskin, San Diego, CA (US); Ying Noyes, San Diego, CA (US); Ho Sang Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 18/315,377

(22) Filed: May 10, 2023

(65) Prior Publication Data

US 2024/0179425 A1     May 30, 2024

Related U.S. Application Data

(60) Provisional application No. 63/385,603, filed on Nov. 30, 2022.

(51) Int. Cl.
    *H04N 23/88*       (2023.01)
    *H04N 25/78*       (2023.01)

(52) U.S. Cl.
    CPC ............. *H04N 23/88* (2023.01); *H04N 25/78* (2023.01)

(58) Field of Classification Search
    CPC ........ H04N 23/88; H04N 25/78; H04N 23/71; H04N 25/11
    See application file for complete search history.

(56) References Cited

U.S. PATENT DOCUMENTS

| | | | |
|---|---|---|---|
| 6,680,748 B1 * | 1/2004 | Monti ................... | H04N 25/76 |
| | | | 348/E3.018 |
| 11,057,572 B1 * | 7/2021 | Wang ..................... | H04N 23/58 |
| 11,196,937 B2 * | 12/2021 | Yao ........................ | H04N 23/54 |
| 11,523,068 B2 * | 12/2022 | Yao ........................ | H04N 19/43 |
| 2011/0310279 A1 * | 12/2011 | Enge ...................... | H04N 25/42 |
| | | | 348/294 |
| 2012/0104231 A1 * | 5/2012 | Elliott .................. | H04N 25/778 |
| | | | 250/208.1 |
| 2013/0162759 A1 * | 6/2013 | Alakarhu ............. | H04N 25/443 |
| | | | 348/E5.051 |
| 2014/0071310 A1 | 3/2014 | Kai | |
| 2014/0211041 A1 | 7/2014 | Mccrackin et al. | |
| 2015/0092066 A1 * | 4/2015 | Geiss ................... | H04N 13/296 |
| | | | 348/180 |

(Continued)

FOREIGN PATENT DOCUMENTS

WO     WO-2021093513 A1 *   5/2021     ........... G09G 3/3208

OTHER PUBLICATIONS

International Search Report and Written Opinion—PCT/US2023/080776—ISA/EPO—Mar. 20, 2024.

*Primary Examiner* — Padma Haliyur

(74) *Attorney, Agent, or Firm* — QUALCOMM Incorporated

(57)        ABSTRACT

Systems and techniques are described for imaging. For instance a process can include obtaining a first image captured using a first portion of an image sensor. The process can further include obtaining a second image captured using a second portion of the image sensor, wherein the second portion is different from the first portion, determining an image capture setting based on the second image, and applying the image capture setting to the first image.

32 Claims, 10 Drawing Sheets

400 ⟍ ➤

430 ⟍ ➤

(56) References Cited

U.S. PATENT DOCUMENTS

| | | | |
|---|---|---|---|
| 2015/0097984 A1* | 4/2015 | Chen | H04N 23/81 |
| | | | 348/223.1 |
| 2015/0201118 A1* | 7/2015 | Lee | H04N 25/589 |
| | | | 348/222.1 |
| 2018/0005344 A1* | 1/2018 | Lim | G06T 1/20 |
| 2018/0189574 A1* | 7/2018 | Brueckner | H04N 19/10 |
| 2018/0241980 A1 | 8/2018 | Lee et al. | |
| 2018/0302573 A1* | 10/2018 | Zobel | H04N 23/951 |
| 2019/0104242 A1 | 4/2019 | Wippermann et al. | |
| 2020/0029023 A1 | 1/2020 | Wippermann et al. | |
| 2020/0167901 A1* | 5/2020 | Fors | H04N 23/71 |
| 2021/0287333 A1* | 9/2021 | Kang | G06T 5/50 |
| 2022/0060619 A1* | 2/2022 | Pinhasov | H04N 23/66 |
| 2022/0256068 A1* | 8/2022 | Geiss | H04N 23/71 |
| 2022/0394156 A1* | 12/2022 | Benemann | G06T 5/80 |
| 2023/0164426 A1* | 5/2023 | Xu | H04N 23/63 |
| | | | 348/222.1 |

* cited by examiner

300

302

350

400
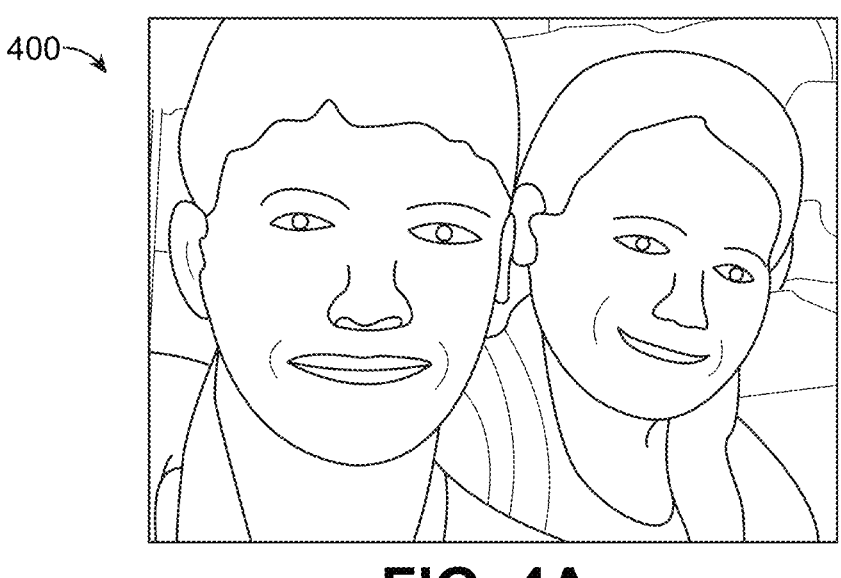
FIG. 4A
430
FIG. 4B
450
452A
452B
452C
452D
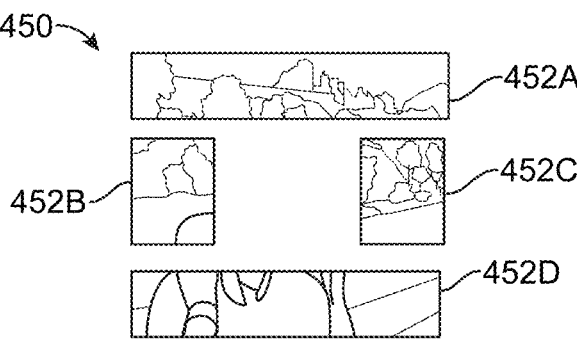
FIG. 4C

600

602

604

602

650

652

654

700

Obtain A First Image Captured Using A First Portion Of An Image Sensor
702

Obtain A Second Image Captured Using A Second Portion Of The Image Sensor, Wherein The Second Portion Is Different From The First Portion
704

Determine An Image Capture Setting Based On The Second Image
706

Apply The Image Capture Setting To The First Image
708

IMAGE SENSOR WITH MULTIPLE IMAGE READOUT

CROSS-REFERENCE TO RELATED APPLICATIONS

This application claims the benefit of U.S. Provisional Application No. 63/385,603, filed Nov. 30, 2022, which is hereby incorporated by reference in its entirety and for all purposes.

FIELD

The present application is generally related to capturing and processing images. For example, aspects of the application relate to an image sensor with multiple image readout.

BACKGROUND

Many devices and systems allow a scene to be captured by generating images (or frames) and/or video data (including multiple frames). For example, a camera or a device including a camera (or cameras) can capture a sequence of frames of a scene (e.g., a video of a scene) based on light entering the camera. To enhance a quality of frames captured by the camera, the camera may include lenses to focus light entering the camera. The sequence of frames captured by the camera can be output for display, can be output for processing and/or consumption by other devices, among other uses.

Recently, image sensors for capturing light for a camera have been increasing in resolution. This increased resolution has allowed certain features to be implemented that take advantage of the increased resolution. As an example, the increase resolution allows for interpolation across multiple pixels to help improve image quality and/or sensitivity. As a more specific example, an image sensor with a native resolution of 48 megapixels may interpolate four pixel of the image sensor into a single pixel for a 12 megapixel image produced by the image sensor. In some cases, the increased resolution allows for high quality in-sensor, digital, zoom to be implemented. In some cases, this in-sensor zoom may be performed using sensor cropping, where a portion of the sensor may transmit a cropped region of the sensor at a higher resolution and/or framerate than typically sent by the image sensor to help improve digital zooming. For example, in-sensor digital zoom may use a center portion of the 48 megapixel sensor at full resolution (e.g., without interpolation) for zoomed images.

BRIEF SUMMARY

In some examples, systems and techniques are described for improved imaging processing, such as for capturing images. For example, an imaging system may include an image sensor with multiple image readout. In one illustrative example, an imaging apparatus is provided. The imaging apparatus includes at least one memory and at least one processor coupled to the at least one memory. The at least one processor is configured to: obtain a first image captured using a first portion of an image sensor; obtain a second image captured using a second portion of the image sensor, wherein the second portion is different from the first portion and wherein the second image has a lower resolution than the first image; determine a white balance setting based on the second image; and apply the white balance setting.

In another example, a method for imaging is provided. The method for imaging includes obtaining a first image captured using a first portion of an image sensor; obtaining a second image captured using a second portion of the image sensor, wherein the second portion is different from the first portion; determining an image capture setting based on the second image; and applying the image capture setting to the first image.

As another example, a non-transitory computer-readable medium is provided that has stored thereon instructions that, when executed by at least one processor, cause the at least one processor to: obtain a first image captured using a first portion of an image sensor; obtain a second image captured using a second portion of the image sensor, wherein the second portion is different from the first portion; determine an image capture setting based on the second image; and apply the image capture setting to the first image.

In another example, an imaging apparatus is provided. The imaging apparatus includes: means for obtaining a first image captured using a first portion of an image sensor; means for obtaining a second image captured using a second portion of the image sensor, wherein the second portion is different from the first portion; means for determining an image capture setting based on the second image; and means for applying the image capture setting to the first image.

In some aspects, one or more of the apparatuses described herein is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIGS. 4A-4C illustrate example images produced by an image sensor with multiple image readout, in accordance with aspects of the present disclosure;

DETAILED DESCRIPTION

Figure 1A:
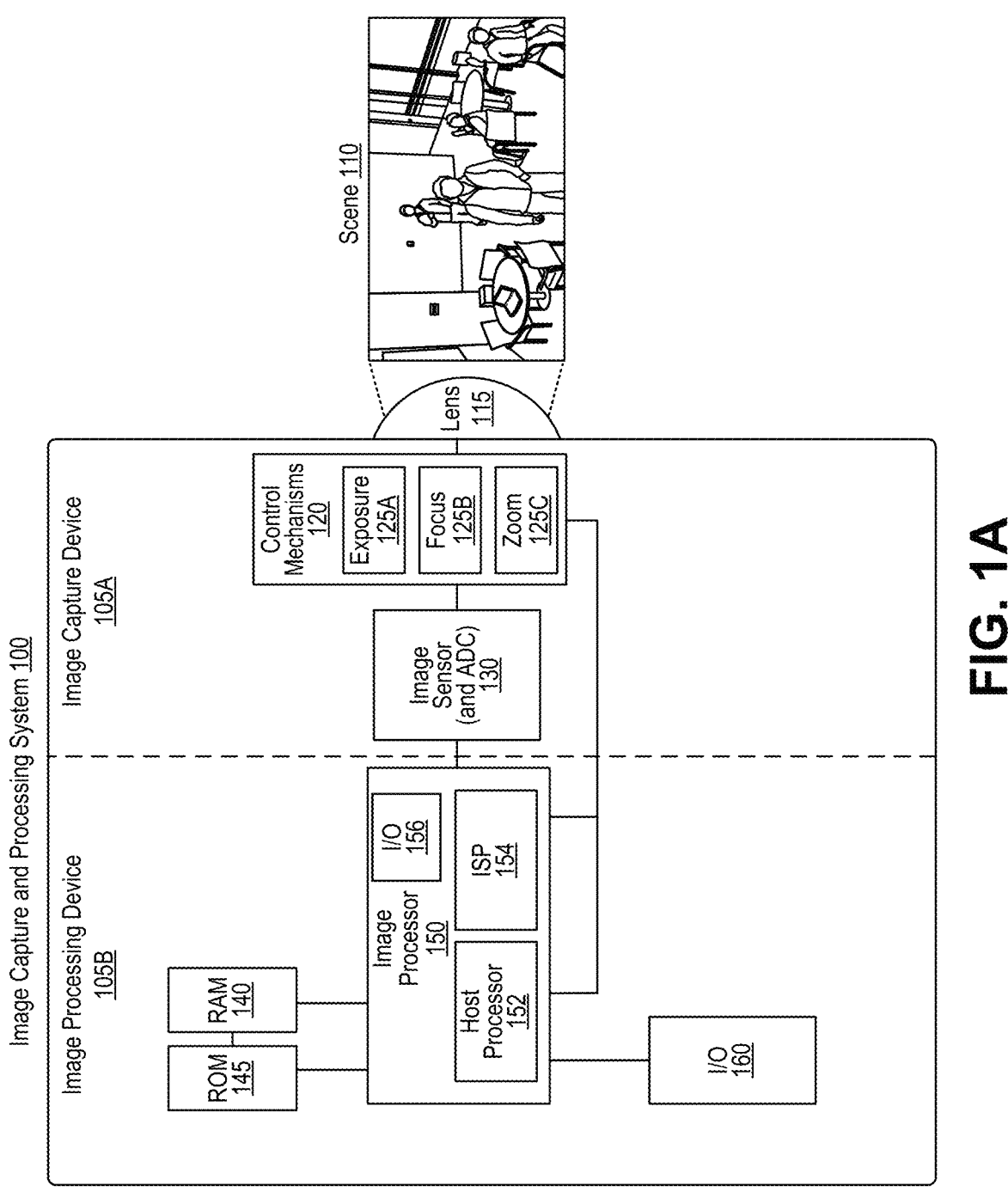
FIG. 1A is a block diagram illustrating an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during the capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor (ISP)) for processing the one or more image frames captured by the image sensor.

One example of an image setting includes white balancing. For example, in some cases, a color temperature of a light source for a scene can cause an image of the scene to appear to have a certain color cast. White balancing may help correct for the color cast and make the image appear more natural looking. Some imaging devices may use automatic white balancing (AWB) to help adjust a white balance of images based on a color temperature of a light source illuminating a scene. Another example of an image setting includes automatic exposure control (AEC) to control exposure of an image sensor when capturing images based on previously-captured images.

In some cases, image settings (e.g., AWB, AEC, etc.) may operate based on a reference region in the image. In certain cases, digital zooming by the imaging device can narrow a field of view of the image sensor (e.g., by performing in-sensor zooming by sensor cropping), making it more difficult to locate a reference region in an image for applying the image settings (e.g., AWB, AEC, etc.). In cases where multiple image or light sensors are available, the other image or light sensors may be used for the image settings (e.g., AWB, AEC, etc.). However, recent trends in image sensors may use a single very high-resolution image sensor to digitally zoom by imaging a certain portion of the image sensor, such as a central portion of the image sensor, at a full resolution available to the image sensor. Regions of the image sensor outside of this central portion may be cropped out and this cropping results in a more narrow field of view for the central portion. In some cases, it may be more difficult to apply the image settings (e.g., perform AWB, AEC, etc.) on this narrowed field of view. Techniques for improving image settings (e.g., AWB, AEC, etc.) for sensors which support in-sensor zoom may be helpful.

Systems, apparatuses, methods (also referred to as processes or techniques), and computer-readable media (collectively referred to herein as "systems and techniques") are described herein for providing an image sensor with multiple image readout. For example, the systems and techniques can improve image settings (e.g., AWB, AEC, etc.) via the image sensor with the multiple image readout. AWB will be used herein as an illustrative example of an image setting that can be improved using the systems and techniques described herein. However, the systems and techniques can be used to improve other types of image settings, such as AEC.

According to some aspects, the system and techniques may include receiving a first high resolution image from the image sensor of a zoomed in portion of the scene along with a second, lower resolution, image of the scene. In some cases, the second image may be a full field of view image of the scene. In other cases, the second image may be portions of the scene outside of the zoomed in portion of the scene. In cases where AWB cannot be determined accurately for a first image, AWB may be performed on a second image to determine a white balance setting and this white balance setting may be used for the first image. In some cases, AWB may be performed concurrently on the first image and the second image. In some cases, the second image may be sub-sampled. For example, every other line or column may be sub-sampled by the image sensor for use in generating the second image.

The systems and techniques described herein provide advantages over existing solutions. For example, by transmitting a lower resolution second image in addition to a higher resolution first image of a zoomed-in portion of a scene, an amount of bandwidth to transmit the images is reduced as compared to transmitting a higher resolution image of the full field of view. Additionally, the second image allows a white balance setting to be determined based on the full field of view as needed when the white balance setting cannot be determined from the zoomed in, narrow field of view image. Further, determining an image setting (e.g., a white balance setting, an exposure setting, etc.) based on the full field of view image captured concurrently as an image with less than a full field of view (e.g., zoomed in portion) by a single sensor allows for more potential references for applying the image setting (e.g., performing AWB, performing AEC, etc.) without using additional sensors or processing based on images captured at a different point in time.

Various aspects of the techniques described herein will be discussed below with respect to the figures. FIG. 1A is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. In some cases, the lens 115 and image sensor 130 can be associated with an optical axis. In one illustrative example, the photosensitive area of the image sensor 130 (e.g., the photodiodes) and the lens 115 can both be centered on the optical axis. The lens 115 bends incoming light from the scene 110 toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Figure 2A:
FIG. 2A and FIG. 2B are diagrams illustrating example Red, Green, and Blue (RGB) color filter arrays, in according with some examples.
Figure 2B:
Figure 2B:
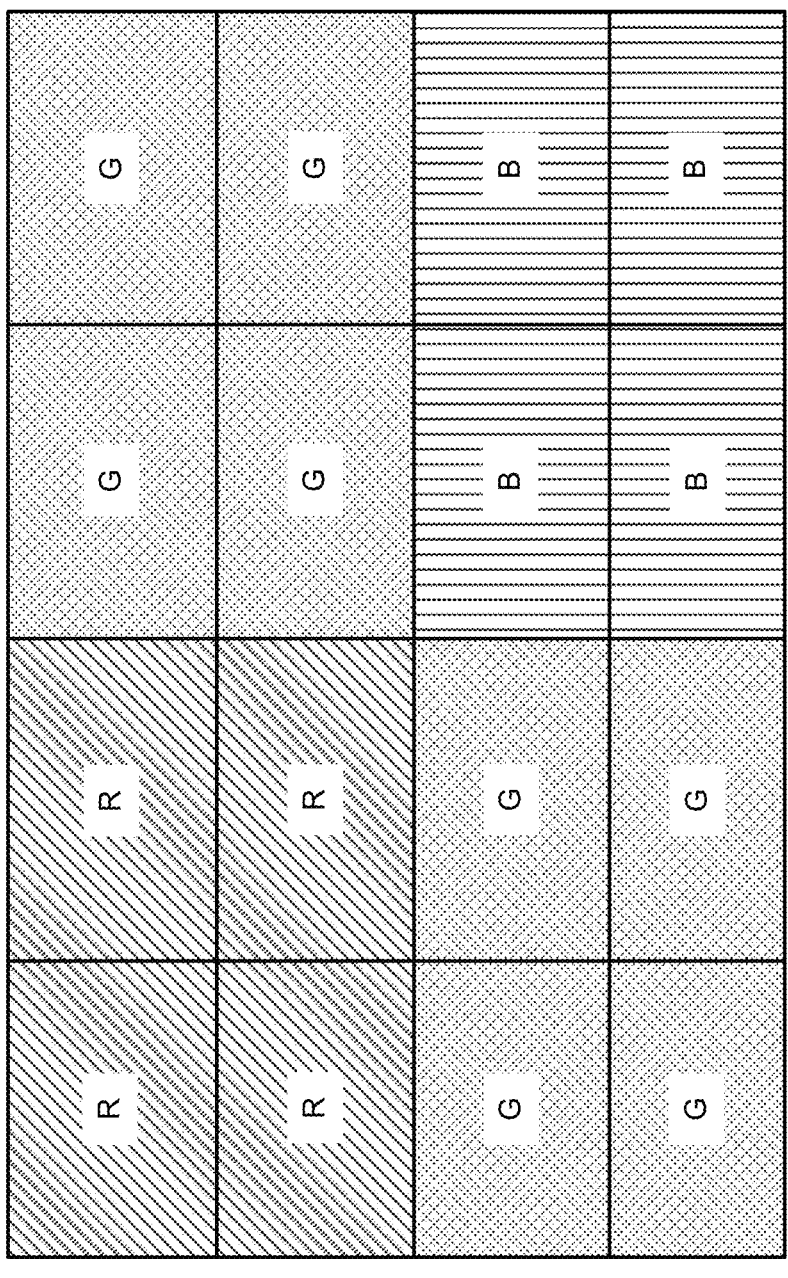

An example of a Bayer color filter array 200 is shown in FIG. 2A. As illustrated in FIG. 2A, the Bayer color filter array 200 includes a repeating pattern of R color filters, B color filters, and G color filters. FIG. 2B illustrates an example quad color filter array (QCFA) 220. As shown, QCFA 220 includes a 2×2 (or "quad") pattern of color filters, including a 2×2 pattern of red (R) color filters, a pair of 2×2 patterns of green (G) color filters, and a 2×2 pattern of blue (B) color filters. The pattern of the Bayer color filter array 200 shown in FIG. 2A, the pattern of the QCFA 220 shown in FIG. 2B, any other color filter, or any combination thereof can be repeated for the entire array of photodiodes of a given image sensor 130.

Returning to FIG. 1A, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., RGB or other color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked).

Returning to FIG. 1A, In some cases, the image sensor 130 may alternately or additionally include opaque and/or reflective masks that block light from reaching certain photodiodes, or portions of certain photodiodes, at certain times and/or from certain angles. In some cases, the opaque and/or reflective masks may be used for phase detection autofocus (PDAF). In some cases, opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output by the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 8:
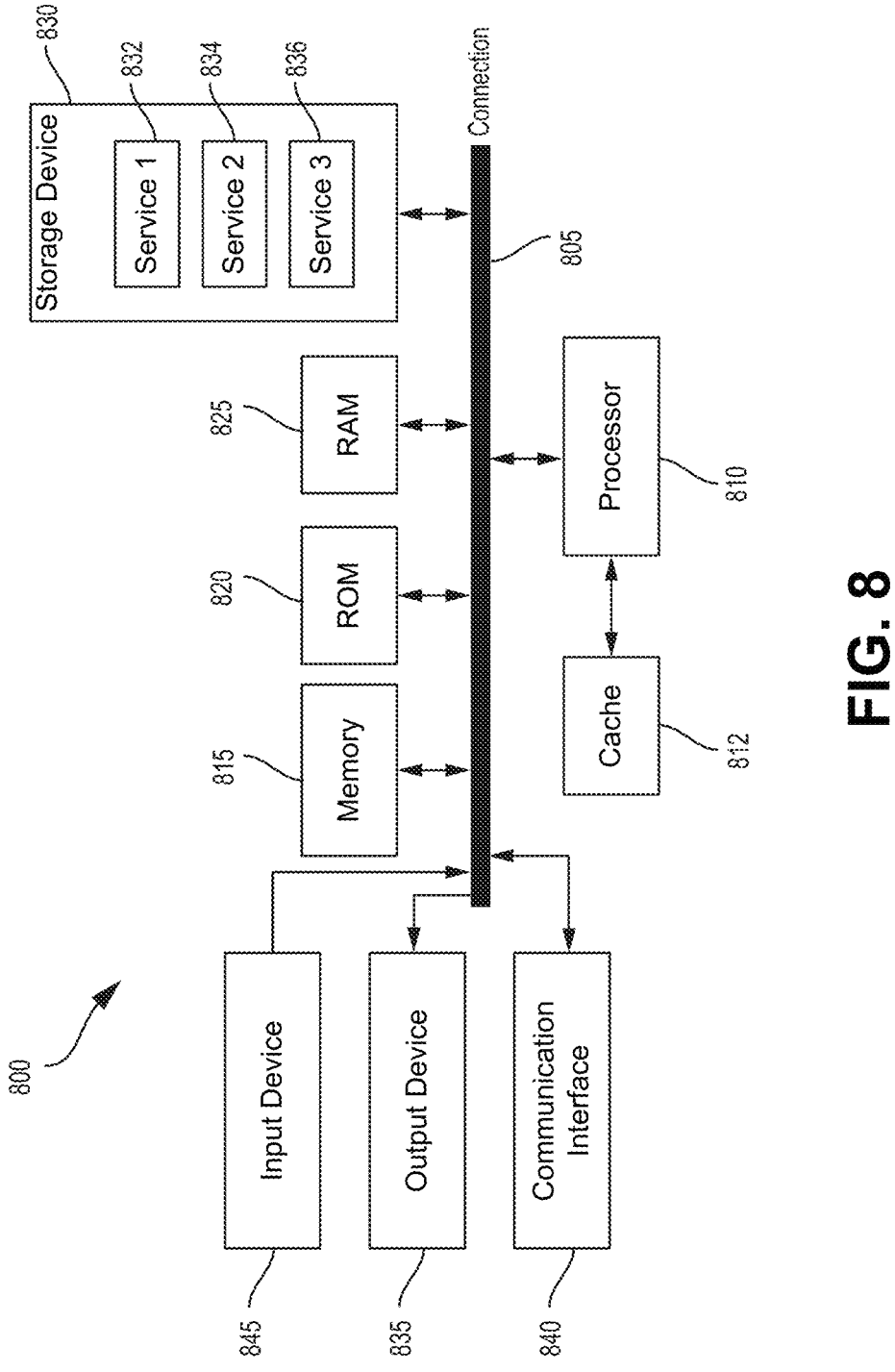
FIG. 8 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 810 discussed with respect to the computing system 800 of FIG. 8. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/825, read-only memory (ROM) 145/820, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 835, any other input devices 845, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1A, a vertical dashed line divides the image capture and processing system 100 of FIG. 1A into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

Figure 1B:
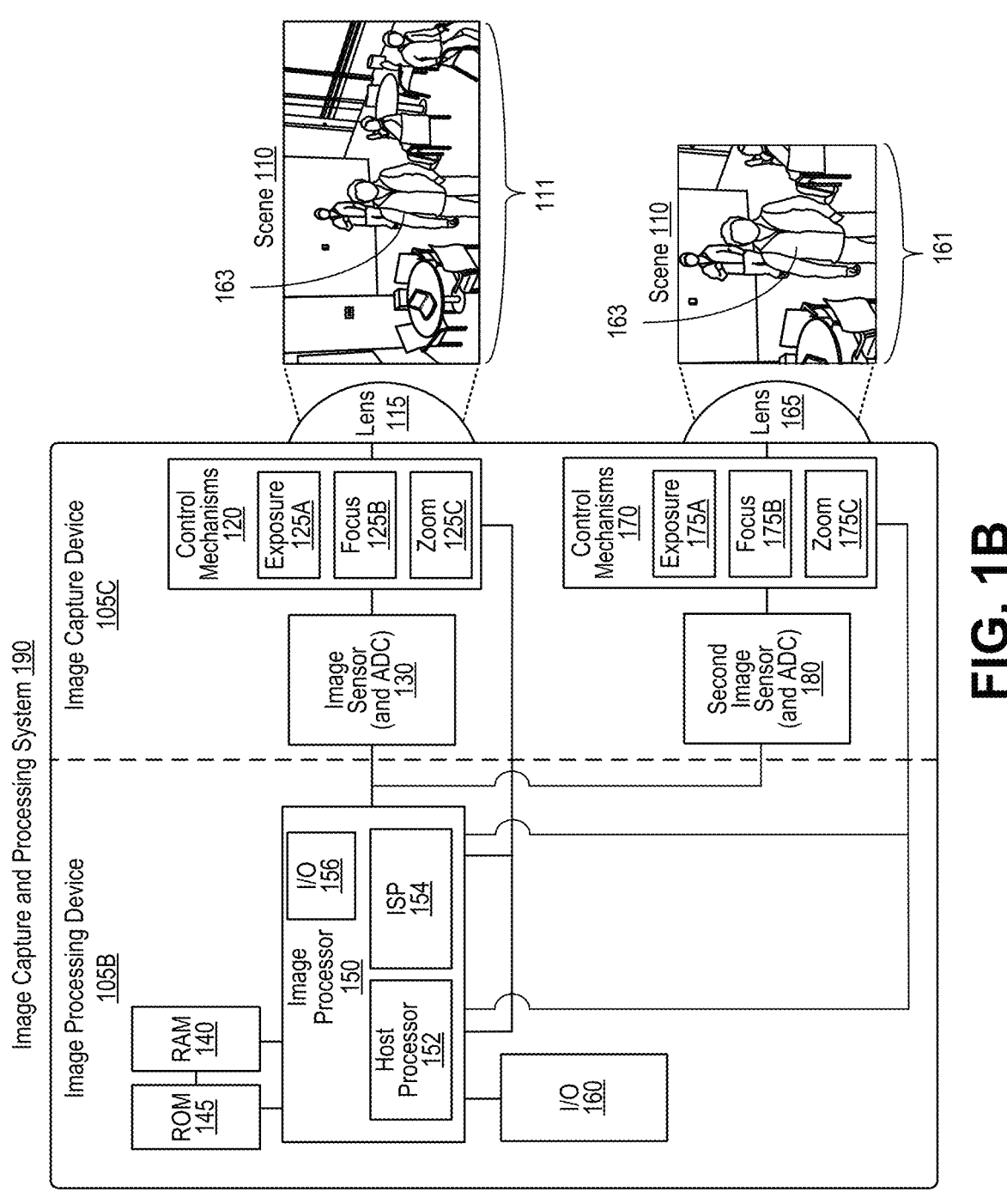
FIG. 1B is a block diagram illustrating an additional architecture of an image capture and processing device in accordance with some examples.

FIG. 1B illustrates another example of an image capture and processing system 190 including the image processing device 105B of FIG. 1B and an image capture device 105C. In the illustrated example, image capture device 105C includes image sensor 130 and control mechanisms 120 described above with respect to FIG. 1A, as well as a second image sensor 180 and control mechanisms 170. The control mechanisms 170 can be similar to and perform similar functions to control mechanisms 120 of FIG. 1A. Exposure control mechanism 175A can be similar to and perform similar functions to exposure control mechanism 125A of FIG. 1A. Focus control mechanism 175B can be similar to and perform similar functions to focus control mechanism 125B of FIG. 1A. Zoom control mechanism 175C can be similar to and perform similar functions to zoom control mechanism 125C.

In some cases, the first image sensor 130 and second image sensor 180 and corresponding lenses 115, 165 of image capture device 105C can have an at least a partially overlapping field of view. As noted above, image sensor 130 and lens 115 can be associated with an optical axis, also referred to as the first optical axis herein. In some examples, the lens 165 and second image sensor can be associated with a second optical axis. In one illustrative example, a photosensitive area of the second image sensor 180 (e.g., the photodiodes) and the lens 165 can be centered on the second optical axis. Other alignments between the image sensor 130 and lens 115 and the second image sensor 180 and lens 165 can be used without departing from the scope of the present disclosure. In some cases, the first optical axis and second optical axis can be physically close together (e.g., multiple cameras of an electronic device). In the illustrated example, the lens 165 can be a different type of lens than lens 115. For example, as illustrated in FIG. 1B, the lens 115 can have a wide field of view 111 (e.g., from a wide-angle lens). In some cases, the lens 165 can have a narrower field of view 161 (e.g., from a telephoto lens) with a higher magnification or zoom factor (as illustrated by the relatively larger size of person 163) than the lens 115. In some cases, one of the image sensor 130 and the second image sensor 180 can be an RGB image sensor and the other of the image sensor 130 and the second image sensor 180 can be an RGBIR sensor.

The image capture and processing systems 100 and/or 190 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device.

In some examples, the image capture and processing systems 100 and/or 190 can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A and/or image capture device 105C can include a camera device and the image processing device 105B can include a computing device, such as a mobile handset, a desktop computer, or other computing device.

While the image capture and processing system 100 and image capture and processing system 190 are shown to include certain components, one of ordinary skill will appreciate that the image capture and processing system 100 and/or image capture and processing system 190 can include more components than those shown in FIG. 1A and FIG. 1B. The components of the image capture and processing systems 100 and/or image capture and processing system 190 can include software, hardware, or one or more combinations of software and hardware. For example, in some implementations, the components of the image capture and processing system 100 and/or image capture and processing system 190 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100 and/or image capture and processing system 190.

Auto white balancing (AWB) may be performed by an imaging device. generally, different light sources may have different color temperatures and these different color temperatures can cause photos to have a color cast. This color cast can make photos appear more yellow or more blue than a scene corresponding to the photo may appear to a human eye. In some cases, AWB may be used to correct for the color temperatures to produce a photo that appears more natural looking. In some cases, AWB may be performed, for example, by the ISP in conjunction with the image sensor(s). For example, AWB may compensate for different color temperatures by analyzing, for example by a component of the ISP, an image captured by the image sensor to identify a gray region. In some cases, AWB may apply one or more heuristics to image data. Statistics may be collected at a low resolution for regions of the image, for example, to indicate the RGB levels in the region. As a mores specific example, the full image may be divided into a grid of 64×48 regions and for each cell of the grid, a ratio between red and green, and a ratio between blue and green may be calculated. Regions which are less saturated generally may be assumed, for example based on a statistical heuristic (e.g., using a set of lookup tables including ratios between blue and green and between red and green indicating a probability the ratios corresponds to possible light sources), to be gray. Once a gray region is identified, the color temperature may be estimated based on the gray region and a probable light source for the image.

In some cases, AWB may not succeed if a reference region cannot be found in an image, or if there is not a suitable gray region for reference. As a more specific example, an image of a clear sky may not have a good gray reference. In such a case, AWB may not be able to distinguish if the sky is blue under daylight color temperature or if the sky is evenly grey and cloudy with an overcast color temperature. In some cases, when AWB is not able to determine a gray reference, AWB may fallback to a default illumination estimate.

Figure 3A:
FIGS. 3A and 3B is an example on how zoom can change a field of view, in accordance with aspects of the present disclosure.
Figure 3B:
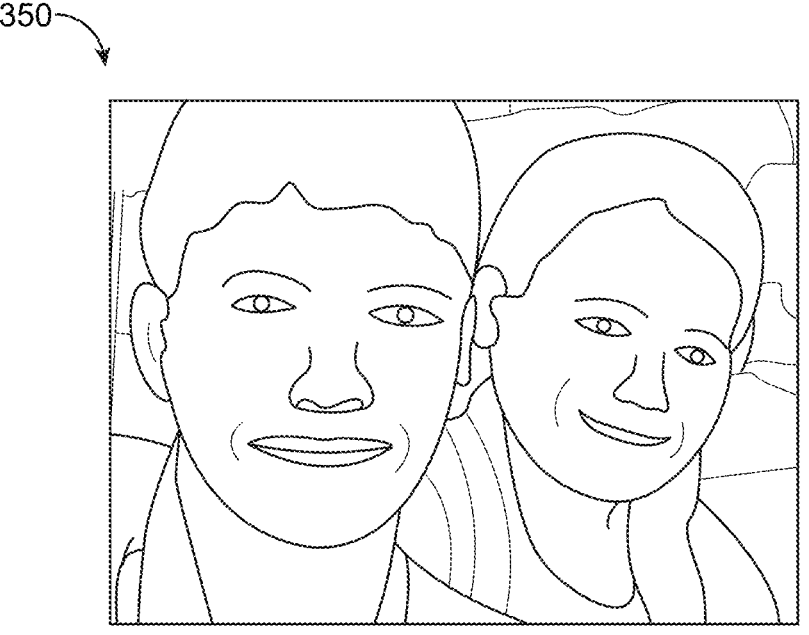

FIGS. 3A and 3B is an example on how zoom can change a field of view, in accordance with aspects of the present disclosure. FIG. 3A illustrates an example full field of view image 300 of a scene. In image 300, a gray reference may be identified by AWB, for example, in a shadowed area 302. In some cases, zoom may present a challenge to AWB as zoom may be used to get closer to a subject in an image and thus narrow the field of view. This narrowed field of view may not have a gray reference. For example, FIG. 3B illustrates an example image 350 of a zoomed in view of the scene. As shown in image 350, the field of view when zoomed in narrows and it may be difficult to detect a gray reference in the image 350.

In some cases, some devices may perform digital zoom, where zoom is performed using the image sensor rather than using optics. For example, certain image sensors may be capable of performing in-sensor zooming where a high resolution sensor, such as a 48 megapixel sensor (or higher) may sense and/or transmit a cropped region (e.g., the zoomed in region) at a higher resolution or framerate. For example, the sensor may, when configured to provide a full field of view image (e.g., with no zoom applied), may produce an image at 12 megapixels, where each pixel of the image may be generated based on data from multiple photodiodes of the image sensor. However, when configured to sense a zoomed in region (e.g., a zoomed in region beyond a certain magnification level, such as 2×, 2.5×, 3×, etc. magnification level), the sensor may sense the zoomed in region at a higher resolution, such as at a full resolution of the image sensor, such that each pixel of the zoomed in image may be generated by a single photodiode of the image sensor (e.g., corresponding to a full field of view image of 48 megapixels). This increased resolution or framerate for the zoomed in image may be used to generate a higher quality image that can be enlarged for the digital zoom. In some cases, when sensing the zoomed in region using the higher resolution, the sensor may provide image data from just the zoomed in region to the ISP. Providing image data from just the zoomed in region helps save bandwidth as the other regions are likely not going to be used to generate a picture. In some cases, the image data provided by the image sensor may be enhanced to provide variable resolution image data to allow for increased AWB performance. Of note, while discussed in the context of white balance and AWB, it may be understood that techniques discussed herein may be applicable to other image capture settings, such as exposure (e.g., auto exposure control) and contrast (e.g., automatic contrast).

FIGS. 4A-4C illustrate example images produced by an image sensor with multiple image readout, in accordance with aspects of the present disclosure. In some cases, when performing in-sensor zoom, the image sensor may transmit, for example to an ISP via a mobile industry processor interface (MIPI) bus, image data for a first image 400 of FIG. 4A corresponding to the zoomed in region at a relatively higher resolution as compared to typical full field of view images captured by the image sensor. That is, the first image 400 may be captured at a higher effective resolution as compared to typical images captured by the sensor (e.g., by having more pixels (e.g., a higher resolution density)

when compared to typical images at a scaled size). In some cases, the first image 400 may be captured and transmitted at a full resolution of the image sensor. In addition to the relatively high resolution first image 400, the image sensor may also transmit image data for a lower resolution (e.g., effective resolution) second image 430 of FIG. 4B, the lower resolution second image 430 may have a wider field of view as compared to the first image 400. Thus, second image 430 of FIG. 4B may have a lower effective resolution, as compared to the first image 400, as the second image 430 may have a lower pixel density, resulting in an image with fewer pixels as compared to the first image 400, when scaled to the same size. In some cases, the field of view of the second image 430 may be consistent to a full (or nearly full) field of view of the image sensor. In some cases, the lower resolution second image 430 and first image 400 may be captured in response to a single capture command. In some cases, the lower resolution second image 430 and first image 400 may be generated based on a single read pass of photodiodes of the image sensor.

In some cases, this second image 430 may be used for AWB. For example, an AWB algorithm may be used to find a gray region of the second image 430 as a reference for determining the white balance, if needed. This determined white balance may be used as the white balance for the first image 400 as well. For example, AWB may first be run against the first image 400. If there is not a suitable gray region (e.g., a statistically probable gray region) for reference (e.g., if the AWB algorithm attempts to fall back to a default white balance), then AWB may be performed on the second image 430. In other cases, the AWB may be performed for both the first image 400 and the second image 430 and if a white balance can be suitably determined for the first image 400, that white balance may be used. If a white balance cannot be suitably determined for the first image 400, then a white balance for the second image 430 may be used. In some cases, the second image 430 may have a larger field of view as compared to the first image 400. In some cases, the second image has a field of view consistent with the entire (or nearly entire) field of view available to the image sensor.

In some cases, the second image 430 has a resolution less than (e.g., lower pixel density, lower effective resolution) another resolution the image sensor would use for a full field of view image. For example, if the sensor usually generates a 12 megapixel image for a full field of view image (e.g., not zoomed or corresponding with a 1× magnification level), the second image 430 may have a resolution less than 12 megapixels, such as one megapixel. In some cases, the resolution of the second image 430 may be substantially lower than the first image 400. For example, the second image 430 may have a resolution of 64×48 or lower. As the second image 430 has a relatively lower resolution, an overall data transmission bandwidth for the image sensor to send the first image 400 and the second image 430 to the ISP may be much lower than the overall data transmission bandwidth for sending an entire field of view image at the same resolution as the first image 400. In some cases, multiple second image 430 may be sent. In some cases, the second image 430 may be generated by subsampling the image sensor outside of the zoomed in region.

In some cases, as shown in FIG. 4C, rather than sending a second image 430 having a larger field of view as compared to the first image 400, the image sensor may transmit the high resolution first image 400 along with relatively lower resolution (e.g., lower pixel density, lower effective resolution) image data for one or more additional images 450 of the peripheral regions around the high resolution area capturing the first image 400. In some cases, the peripheral regions are adjacent (e.g., next) to the high resolution area capturing the first image 400. In FIG. 4C, four additional images 450 are transmitted, one image of the peripheral arca 452A above the high resolution area for the first image 400, one image of the peripheral arca 452B to the left the high resolution area for the first image 400, one image of the peripheral area 452C to the right the high resolution area for the first image 400, and one image of the peripheral area 452D below the high resolution area for the first image 400. In some cases, the additional images 450 may be captured/transmitted (e.g. to the ISP) at a lower pixel density (e.g., to produce a lower resolution image) than another pixel density the image sensor would use for a full field of view image. The second image 430 and the additional images 450 provide a larger field of view, as compared to the zoomed in first image 400, that can be used for AWB. Once a white balance setting (e.g., image capture setting) is determined based on either the second image 430 and/or the additional images 450, the white balance setting may be applied to the first image 400 (e.g., by the ISP). In some examples, the white balance setting (or other image capture setting) may be applied in substantially the same way as the white balance setting would have been applied had the white balance setting been determined based on the first image 400 using any technique for adjusting a white balance (or other image capture setting) of an image. In some cases, the additional images 450 and first image 400 may also be captured in response to a single capture command. In some cases, the additional images 450 and first image 400 may be generated based on a single read pass of photodiodes of the image sensor.

Figure 5:
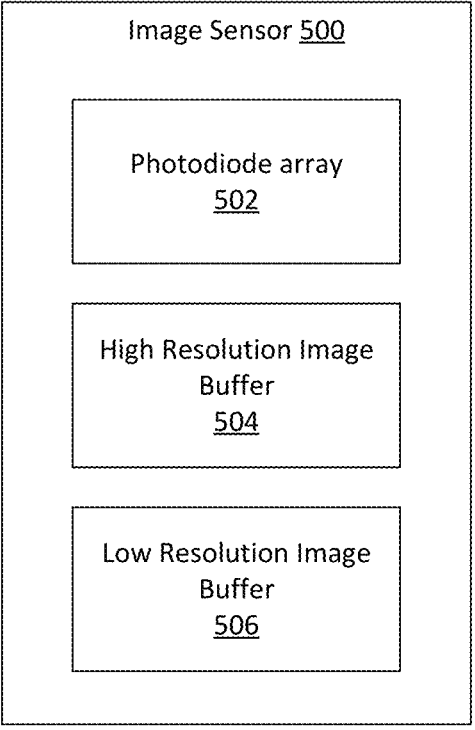
FIG. 5 is a block diagram of an example image sensor with multiple image readout, in accordance with aspects of the present disclosure.

FIG. 5 is a block diagram of an example image sensor 500 with multiple image readout, in accordance with aspects of the present disclosure. In some cases, image sensor 500 may include a photodiode array 502 for sensing light along with a high resolution image buffer 504 and a low resolution image buffer 506. The image buffers may store image data being read from the photodiode array 502 before being transmitted, for example, to the ISP (not shown). In some cases, when in-sensor zoom is being used, the high resolution image buffer 504 may store image data captured from a high resolution (e.g., at a higher image density), zoomed area. For example, image data for first image 400 of FIG. 4A may be stored in the high resolution image buffer 504. In some cases, the low resolution image buffer 506 may store lower resolution image data, such as image data for a lower resolution, full field of image. For example, image data for the second image 430 of FIG. 4B or image data for the peripheral areas around the high resolution zoomed area, such as for the additional images 450 of FIG. 4C may be stored in the low resolution image buffer 506. In some cases, multiple low resolution image buffers 506 may be used for individual images of the peripheral areas around the high resolution zoomed area, such as a separate buffer for images of the additional images 450 of FIG. 4C.

In some cases, operations of an image sensor capable of performing multiple image readout may be enhanced to help reduce power consumption and processing time. In some cases, it may take a certain amount of power, time, and/or bandwidth for an image sensor to sample a full field of view of the photodiode array, especially at a full resolution. As the second image 430 of FIG. 4B or additional images 450 of FIG. 4C may be performed at a lower resolution, it may beneficial for the image sensor to apply sub-sampling in the regions outside of the high resolution region used to generate the first image 400.

Figure 6A:
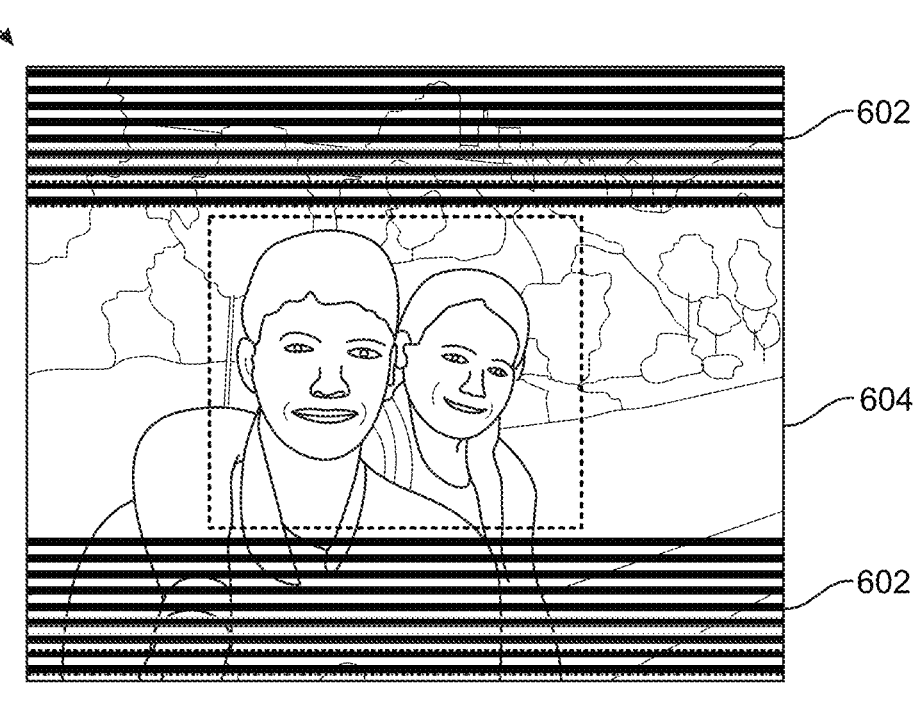
FIGS. 6A and 6B illustrate additional enhancements for multiple image readout, in accordance with aspects of the present disclosure.
Figure 6B:

FIGS. 6A and 6B illustrate additional enhancements for multiple image readout, in accordance with aspects of the present disclosure. In some cases, the image sensor may skip sampling certain sampling pixels when performing zooming with multiple image readout. In some cases, the skipped pixels may be located in regions that do not need to be sampled at a relatively higher resolution, such as peripheral areas outside of the high resolution zoomed area. Image 600 of FIG. 6A represents scanned portions of a photodiode array for an image sensor. In image 600, peripheral regions 602 above and below a high resolution region 604 may be sub-sampled by skipping the sampling of certain rows (e.g., every other row, every two rows, or another such similar pattern). In image 600, peripheral regions to the right and left of the high resolution region 604 may be scanned in high resolution as well. In some cases, such as in image 650 of FIG. 6B, peripheral regions 652 above, below, to the left, and to the right of a high resolution region 654 may be sub-sampled by skipping the sampling of certain lines. In some cases, the image sensor may sub-sample peripheral regions by skipping (e.g., binning) certain columns instead of, or in addition to skipping lines.

In some cases, instead of transmitting the peripheral regions to the ISP, the image sensor may perform some white balance processing and transmit information about the white balance to the ISP. For example, the image sensor may analyze the peripheral regions, as discussed above, and send a white balance calibration (WBC) scaler and/or an estimated color temperature via a separate metadata channel (e.g., a separate virtual channel from the image data, where virtual channels may be separated by a virtual channel number, different ports, and the like).

In some cases, image data may be transmitted by the image sensor to the ISP over multiple virtual channels (e.g., MIPI channels). For example, the image data for the high resolution region may be transmitted via a first virtual channel and the image data for the peripheral regions (or relatively lower resolution full field of view image) may be transmitted by a one or more other virtual channels. In some cases, these virtual channels may operate in an interleaved manner where information is transmitted via the first virtual channel, then from the other virtual channel(s), then the first virtual channel, and so forth. In some cases, the image data for the high resolution region may be transmitted before transmitting the image data for the peripheral regions (or relatively lower resolution full field of view image). The image data from the peripheral regions (or relatively lower resolution full field of view image) may be a lower resolution and smaller than the image data from the high resolution region. Thus, in some cases, the image data from the peripheral regions may be stored in memory while the image data from the high resolution region is transmitted to the ISP. For example, the image sensor may read image data from the photodiode array in a raster scan order from right to left and top to bottom. The image sensor may initially read image data from the photodiodes in the peripheral region (or for relatively lower resolution full field of view image) at a lower resolution (optionally with sub-sampling). The image sensor may store the image data from the peripheral region. When the image sensor reaches the high resolution region, the image sensor may read image data from the photodiodes at a higher resolution (e.g., at a full resolution, reading image data from each photodiode individually without interpolation, binning, etc.). The image sensor may stream the image data from the high resolution region to the ISP. When the image sensor reaches another peripheral region the image sensor may switch back to reading the image data at a lower resolution and storing the image data. This pattern may continue until the image data read out is complete. The stored image data for the peripheral regions may then be sent to the ISP.

Figure 7:
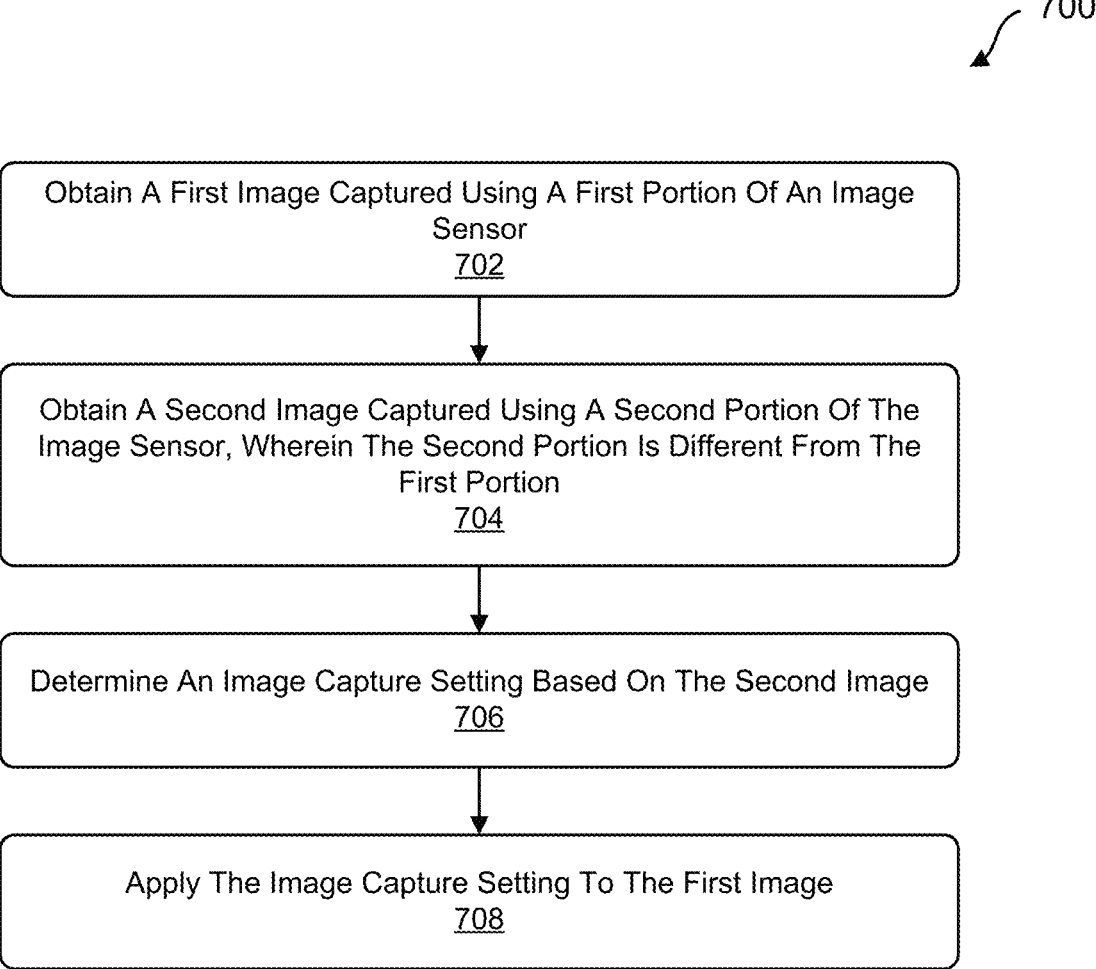
FIG. 7 is a flow diagram illustrating a technique for applying an image capture setting for an image sensor with multiple image readout, in accordance with aspects of the present disclosure.

FIG. 7 is a flow diagram illustrating a process 700 for applying an image capture setting for an image sensor with multiple image readout, in accordance with aspects of the present disclosure. The process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 700 may be implemented as software components that are executed and run on one or more processors.

At block 702, the computing device (or component thereof) may obtain a first image captured using a first portion of an image sensor. In some cases, the first image is received separate from the second image. In some cases, the computing device (or component thereof) may transmit a capture command to the image sensor, and wherein the first image and the second image are received in response to the capture command. In some cases, the first image and the second image are received based on a single read of the image sensor.

At block 704, the computing device (or component thereof) may obtain a second image captured using a second portion of the image sensor, wherein the second portion is different from the first portion. In some cases, the portions may be different as not all pixels of the image sensor that are sensed for the first image may be sensed for the second image. In some examples, the portions may partially overlap (e.g., some pixels of the image sensor may be sensed for both the first portion and second portion, for example if the second image includes a part of the first image as in second image 430 of FIG. 4B and first image 400 of FIG. 4A) or the portions may be non-overlapping (e.g., as in additional images 450 and first image 400 of FIG. 4A). In some examples, the second image is captured at a lower pixel density. In some cases, the image capture setting comprises one of a white balance setting or an exposure setting. In some cases, the second image has a wider field of view than the first image. In some cases, the second image comprises a full field of view of the image sensor. In some cases, the second portion is adjacent to the first portion. In some cases, the computing device (or component thereof) may determine that a white balance setting cannot be determined for the first image. In some cases, the computing device (or component thereof) may, based on the determination that the white balance setting cannot be determined for the first image, determine the white balance setting for the first image based on the second image. In some cases, the computing device (or component thereof) may, to determine that the white balance setting cannot be determined for the first image, attempt to determine the white balance setting based on the first image; and determine that a reference region cannot be found in the first image. In some cases, the second portion of the image sensor is separate from the first portion of the image sensor. In some cases, the second image is sub-sampled from the second portion. In some cases, the second image is sub-sampled by at least one of skipping rows or columns of photodiodes of the image sensor.

At block 706, the computing device (or component thereof) may determine an image capture setting based on the second image. At block 708, the computing device (or component thereof) may apply the image capture setting to the first image. In some cases, the computing device (or component thereof) may apply the white balance setting determined based on the second image to the first image.

FIG. 8 is a diagram illustrating an example of a system for implementing certain aspects of the present technology. In particular, FIG. 8 illustrates an example of computing system 800, which can be for example any computing device making up internal computing system, a remote computing system, a camera, or any component thereof in which the components of the system are in communication with each other using connection 805. Connection 805 can be a physical connection using a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache 812 of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An imaging apparatus, comprising: at least one memory; and at least one processor coupled to the at least one memory, the at least one processor configured to: obtain a first image captured using a first portion of an image sensor; obtain a second image captured using a second portion of the image sensor, wherein the second portion is different from the first portion and wherein the second image has a lower resolution than the first image; determine a white balance setting based on the second image; and apply the white balance setting.

Aspect 2. The imaging apparatus of aspect 1, wherein the second image has a wider field of view than the first image.

Aspect 3. The imaging apparatus of any of aspects 1 or 2, wherein the second image comprises a full field of view of the image sensor.

Aspect 4. The imaging apparatus of any one of aspects 1 to 3, wherein the second portion is adjacent to the first portion.

Aspect 5. The imaging apparatus of any one of aspects 1 to 4, wherein the at least one processor is further configured to determine that a white balance setting cannot be determined for the first image.

Aspect 6. The imaging apparatus of aspect 5, wherein the at least one processor is configured to, based on the determination that the white balance setting cannot be determined for the first image, determine the white balance setting based on the second image.

Aspect 7. The imaging apparatus of any one of aspects 5 or 6, wherein, to determine that the white balance setting cannot be determined for the first image, the at least one processor is further configured to: attempt to determine the white balance setting based on the first image; and determine that a reference region cannot be found in the first image.

Aspect 8. The imaging apparatus of any one of aspects 1 to 7, wherein the second portion of the image sensor is separate from the first portion of the image sensor.

Aspect 9. The imaging apparatus of any one of aspects 1 to 8, wherein the second image is sub-sampled from the second portion.

Aspect 10. The imaging apparatus of any one of aspects 1 to 9, wherein the second image is sub-sampled by at least one of skipping rows or columns of photodiodes of the image sensor.

Aspect 11. The imaging apparatus of any one of aspects 1 to 10, wherein the first image is received separate from the second image.

Aspect 12. The imaging apparatus of any one of aspects 1 to 11, wherein the at least one processor is further configured to transmit a capture command to the image sensor, and wherein the first image and the second image are received in response to the capture command.

Aspect 13. The imaging apparatus of any one of aspects 1 to 12, wherein the first image and the second image are received based on a single read of the image sensor.

Aspect 14. The imaging apparatus of any one of aspects 1 to 13, wherein the at least one processor is configured to apply the white balance setting determined based on the second image to the first image.

Aspect 15. A method for imaging, comprising: obtaining a first image captured using a first portion of an image sensor; obtaining a second image captured using a second portion of the image sensor, wherein the second portion is different from the first portion and wherein the second image has a lower resolution than the first image; determining a white balance setting based on the second image; and applying the white balance setting.

Aspect 16. The method of aspect 15, wherein the second image has a wider field of view than the first image.

Aspect 17. The method of any of aspects 15 or 16, wherein the second image comprises a full field of view of the image sensor.

Aspect 18. The method of any one of aspects 15 to 17, wherein the second portion is adjacent to the first portion.

Aspect 19. The method of any one of aspects 15 to 18, further comprising determining that a white balance setting cannot be determined for the first image.

Aspect 20. The method of aspect 19, wherein determining the white balance setting based on the second image is based on the determination that the white balance setting cannot be determined for the first image.

Aspect 21. The method of any one of aspects 19 or 20, wherein determining that the white balance setting cannot be determined for the first image comprises: attempting to determine the white balance setting based on the first image; and determining that a reference region cannot be found in the first image.

Aspect 22. The method of any one of aspects 15 to 21, wherein the second portion of the image sensor is separate from the first portion of the image sensor.

Aspect 23. The method of any one of aspects 15 to 22, wherein the second image is sub-sampled from the second portion.

Aspect 24. The method of any one of aspects 15 to 23, wherein the second image is sub-sampled by at least one of skipping rows or columns of photodiodes of the image sensor.

Aspect 25. The method of any one of aspects 15 to 24, wherein the first image is received separate from the second image.

Aspect 26. The method of any one of aspects 15 to 25, further comprising transmitting a capture command to the image sensor, and wherein the first image and the second image are received in response to the capture command.

Aspect 27. The method of any one of aspects 15 to 26, wherein the first image and the second image are received based on a single read of the image sensor.

Aspect 28. The method of any one of aspects 15 to 27, further comprising applying the white balance setting determined based on the second image to the first image.

Aspect 29. A non-transitory computer-readable medium having stored thereon instructions that, when executed by at least one processor, cause the at least one processor to: obtain a first image captured using a first portion of an image sensor; obtain a second image captured using a second portion of the image sensor, wherein the second portion is different from the first portion and wherein the second image has a lower resolution than the first image; determine a white balance setting based on the second image; and apply the white balance setting.

Aspect 30. The non-transitory computer-readable medium of aspect 29, wherein the second image has a wider field of view than the first image.

Aspect 31. The non-transitory computer-readable medium of any of aspects 29 or 30, wherein the second image comprises a full field of view of the image sensor.

Aspect 32. The non-transitory computer-readable medium of any one of aspects 29 to 31, wherein the second portion is adjacent to the first portion.

Aspect 33. The non-transitory computer-readable medium of any one of aspects 29 to 32, wherein the instructions further cause the at least one processor to determine that a white balance setting cannot be determined for the first image.

Aspect 34. The non-transitory computer-readable medium of aspect 33, wherein the instructions further cause the at least one processor to, based on the determination that the white balance setting cannot be determined for the first image, determine the white balance setting based on the second image.

Aspect 35. The non-transitory computer-readable medium of any one of aspects 33 or 34, wherein, to determine that the white balance setting cannot be determined for the first image, the instructions further cause the at least one processor to: attempt to determine the white balance setting based on the first image; and determine that a reference region cannot be found in the first image.

Aspect 36. The non-transitory computer-readable medium of any one of aspects 29 to 35, wherein the second portion of the image sensor is separate from the first portion of the image sensor.

Aspect 37. The non-transitory computer-readable medium of any one of aspects 29 to 36, wherein the second image is sub-sampled from the second portion.

Aspect 38. The non-transitory computer-readable medium of any one of aspects 29 to 37, wherein the second image is sub-sampled by at least one of skipping rows or columns of photodiodes of the image sensor.

Aspect 39. The non-transitory computer-readable medium of any one of aspects 29 to 38, wherein the first image is received separate from the second image.

Aspect 40. The non-transitory computer-readable medium of any one of aspects 29 to 39, wherein the instructions further cause the at least one processor to transmit a capture command to the image sensor, and wherein the first image and the second image are received in response to the capture command.

Aspect 41. The non-transitory computer-readable medium of any one of aspects 29 to 40, wherein the first image and the second image are received based on a single read of the image sensor.

Aspect 42. The non-transitory computer-readable medium of any one of aspects 29 to 41, wherein the at least one processor is configured to apply the white balance setting determined based on the second image to the first image.

Aspect 43. An imaging apparatus, comprising means for obtaining a first image captured using a first portion of an image sensor; means for obtaining a second image captured using a second portion of the image sensor, wherein the second portion is different from the first portion and wherein the second image has a lower resolution than the first image;

means for determining a white balance setting based on the second image; and means for applying the white balance setting.

Aspect 44: The apparatus of Aspect 43, further comprising one or more means for performing any of the operations of aspects 16 to 28.

Aspect 45. An imaging apparatus, comprising: at least one memory; and at least one processor coupled to the at least one memory, the at least one processor configured to: obtain a first image captured using a first portion of an image sensor; obtain a second image captured using a second portion of the image sensor, wherein the second portion is different from the first portion; determine an image capture setting based on the second image; and apply the image capture setting to the first image.

Aspect 46. The imaging apparatus of Aspect 45, wherein the second image is captured at a lower pixel density.

Aspect 47. The imaging apparatus of any of Aspects 45-46, wherein the image capture setting comprises one of a white balance setting or an exposure setting.

Aspect 48. The imaging apparatus of any of Aspects 45-47, wherein the second image has a wider field of view than the first image.

Aspect 49. The imaging apparatus of any of Aspects 45-48, wherein the second image comprises a full field of view of the image sensor.

Aspect 50. The imaging apparatus of any of Aspects 45-49, wherein the second portion is adjacent to the first portion.

Aspect 51. The imaging apparatus of any of Aspects 45-50, wherein the image capture setting comprises a white balance setting, and wherein the at least one processor is further configured to: determine that the image capture setting cannot be suitably determined for the first image; and based on the determination that the image capture setting cannot be suitably determined for the first image, determine the image capture setting for the first image based on the second image.

Aspect 52. The imaging apparatus of Aspect 51, wherein, to determine that the white balance setting cannot be suitably determined for the first image, the at least one processor is further configured to: attempt to determine the white balance setting based on the first image; and determine that a reference region cannot be found in the first image.

Aspect 53. The imaging apparatus of any of Aspects 45-52, wherein the second image is sub-sampled from the second portion by at least one of skipping rows or skipping columns of photodiodes of the image sensor.

Aspect 54. The imaging apparatus of any of Aspects 45-53, wherein the first image is received separate from the second image.

Aspect 55. The imaging apparatus of any of Aspects 45-54, wherein the at least one processor is further configured to transmit a capture command to the image sensor, wherein the first image and the second image are received in response to the capture command, and wherein the first image and the second image are received based on a single read of the image sensor.

Aspect 56. A method for imaging, comprising: obtaining a first image captured using a first portion of an image sensor; obtaining a second image captured using a second portion of the image sensor, wherein the second portion is different from the first portion; determining an image capture setting based on the second image; and applying the image capture setting to the first image.

Aspect 57. The method of Aspect 56, wherein the second image is captured at a lower pixel density.

Aspect 58. The method of any of Aspects 56-57, wherein the image capture setting comprises one of a white balance setting or an exposure setting.

Aspect 59. The method of any of Aspects 56-58, wherein the second image has a wider field of view than the first image.

Aspect 60. The method of any of Aspects 56-59, wherein the second image comprises a full field of view of the image sensor.

Aspect 61. The method of any of Aspects 56-60, wherein the second portion is adjacent to the first portion.

Aspect 62. The method of any of Aspects 56-61, wherein the image capture setting comprises a white balance setting, and further comprising: determining that the white balance setting cannot be suitably determined for the first image; and based on the determining that the white balance setting cannot be suitably determined for the first image, determining the white balance setting for the first image based on the second image.

Aspect 63. The method of Aspect 62, wherein determining that the white balance setting cannot be suitably determined for the first image comprises: attempting to determine the white balance setting based on the first image; and determining that a reference region cannot be found in the first image.

Aspect 64. The method of any of Aspects 56-63, wherein the second image is sub-sampled from the second portion by at least one of skipping rows or skipping columns of photodiodes of the image sensor.

Aspect 65. The method of any of Aspects 56-64, wherein the first image is received separate from the second image.

Aspect 66. The method of any of Aspects 56-65, further comprising transmitting a capture command to the image sensor, wherein the first image and the second image are received in response to the capture command, and wherein the first image and the second image are received based on a single read of the image sensor.

Aspect 67. A non-transitory computer-readable medium having stored thereon instructions that, when executed by at least one processor, cause the at least one processor to: obtain a first image captured using a first portion of an image sensor; obtain a second image captured using a second portion of the image sensor, wherein the second portion is different from the first portion; determine an image capture setting based on the second image; and apply the image capture setting to the first image.

Aspect 68. The non-transitory computer-readable medium of Aspect 67, wherein the second image is captured at a lower pixel density.

Aspect 69. The non-transitory computer-readable medium of any of Aspects 67-68, wherein the image capture setting comprises one of a white balance setting or an exposure setting.

Aspect 70. The non-transitory computer-readable medium of any of Aspects 67-69, wherein the second image has a wider field of view than the first image.

Aspect 71. The non-transitory computer-readable medium of any of Aspects 67-70, wherein the second image comprises a full field of view of the image sensor.

Aspect 72. The non-transitory computer-readable medium of any of Aspects 67-71, wherein the second portion is adjacent to the first portion.

Aspect 73. The non-transitory computer-readable medium of any of Aspects 67-72, wherein the image capture setting comprises a white balance setting, and wherein the instructions further cause the at least one processor to: determine that the white balance setting cannot be suitably determined for the first image; and based on the determination that the white balance setting cannot be suitably determined for the first image, determine the white balance setting for the first image based on the second image.

Aspect 74. The non-transitory computer-readable medium of Aspect 73, wherein, to determine that the white balance setting cannot be suitably determined for the first image, the instructions further cause the at least one processor to: attempt to determine the white balance setting based on the first image; and determine that a reference region cannot be found in the first image.

Aspect 75. The non-transitory computer-readable medium of any of Aspects 67-74, further comprising instructions to cause the processor to perform any of the operations of Aspects 56-66.

Aspect 76. An imaging apparatus, comprising means for obtaining a first image captured using a first portion of an image sensor; means for obtaining a second image captured using a second portion of the image sensor, wherein the second portion is different from the first portion; means for determining an image capture setting based on the second image; and means for applying the image capture setting to the first image.

Aspect 77: The apparatus of Aspect 43, further comprising one or more means for performing any of the operations of Aspects 56 to 66.

What is claimed is:

1. An imaging apparatus, comprising:
at least one memory; and
at least one processor coupled to the at least one memory, the at least one processor configured to:
   obtain a first image data captured using a first portion of an image sensor, wherein the first image data has a first field of view;
   obtain a second image data captured using a second portion of the image sensor, the second image data having a second field of view that is outside of the first field of view, wherein the second portion is different from the first portion, and wherein the first image data and second image data are captured in a single read of the image sensor;
   determine an image capture setting based on the second image data; and
   apply the image capture setting determined based on the second image data to the first image data to generate an image for output.

2. The imaging apparatus of claim 1, wherein the second image data is captured at a lower pixel density.

3. The imaging apparatus of claim 1, wherein the image capture setting comprises one of a white balance setting or an exposure setting.

4. The imaging apparatus of claim 1, wherein the second image data has a wider field of view than the first image data.

5. The imaging apparatus of claim 1, wherein the second image data comprises a full field of view of the image sensor.

6. The imaging apparatus of claim 1, wherein the second portion is adjacent to the first portion.

7. The imaging apparatus of claim 1, wherein the image capture setting comprises a white balance setting, and wherein the at least one processor is further configured to:
   determine that the white balance setting cannot be suitably determined for the first image data; and
   based on the determination that the white balance setting cannot be suitably determined for the first image data, determine the white balance setting for the first image data based on the second image data.

8. The imaging apparatus of claim 7, wherein, to determine that the white balance setting cannot be suitably determined for the first image data, the at least one processor is further configured to:
   attempt to determine the white balance setting based on the first image data; and
   determine that a reference region cannot be found in the first image data.

9. The imaging apparatus of claim 1, wherein the second image data is sub-sampled from the second portion by at least one of skipping rows or skipping columns of photodiodes of the image sensor.

10. The imaging apparatus of claim 1, wherein the first image data is received separate from the second image data.

11. The imaging apparatus of claim 1, wherein the at least one processor is further configured to transmit a capture command to the image sensor, wherein the first image data and the second image data are received in response to the capture command, and wherein the first image data and the second image data are received based on a single read of the image sensor.

12. The imaging apparatus of claim 1, wherein the first image data is captured at a different resolution compared to the second image data.

13. The imaging apparatus of claim 1, wherein the image for output has the first field of view.

14. A method for imaging, comprising:
   obtaining a first image data captured using a first portion of an image sensor, wherein the first image data has a first field of view;
   obtaining a second image data captured using a second portion of the image sensor, the second image data having a second field of view that is outside of the first field of view, wherein the second portion is different from the first portion, and wherein the first image data and second image data are captured in a single read of the image sensor;
   determining an image capture setting based on the second image data; and
   applying the image capture setting determined based on the second image data to the first image data.

15. The method of claim 14, wherein the second image data is captured at a lower pixel density.

16. The method of claim 14, wherein the image capture setting comprises one of a white balance setting or an exposure setting.

17. The method of claim 14, wherein the second image data has a wider field of view than the first image data.

18. The method of claim 14, wherein the second image data comprises a full field of view of the image sensor.

19. The method of claim 14, wherein the second portion is adjacent to the first portion.

20. The method of claim 14, wherein the image capture setting comprises a white balance setting, and further comprising:
   determining that the white balance setting cannot be suitably determined for the first image data; and
   based on the determining that the white balance setting cannot be suitably determined for the first image data, determining the white balance setting for the first image data based on the second image data.

21. The method of claim 20, wherein determining that the white balance setting cannot be suitably determined for the first image data comprises:
   attempting to determine the white balance setting based on the first image data; and determining that a reference region cannot be found in the first image data.

22. The method of claim 14, wherein the second image data is sub-sampled from the second portion by at least one of skipping rows or skipping columns of photodiodes of the image sensor.

23. The method of claim 14, wherein the first image data is received separate from the second image data.

24. The method of claim 14, further comprising transmitting a capture command to the image sensor, wherein the first image data and the second image data are received in response to the capture command, and wherein the first image data and the second image data are received based on a single read of the image sensor.

25. A non-transitory computer-readable medium having stored thereon instructions that, when executed by at least one processor, cause the at least one processor to:

obtain a first image data captured using a first portion of an image sensor, wherein the first image data has a first field of view;

obtain a second image data captured using a second portion of the image sensor, the second image data having a second field of view that is outside of the first field of view, wherein the second portion is different from the first portion, and wherein the first image data and second image data are captured in a single read of the image sensor;

determine an image capture setting based on the second image data; and apply the image capture setting determined based on the second image data to the first image data.

26. The non-transitory computer-readable medium of claim 25, wherein the second image data is captured at a lower pixel density.

27. The non-transitory computer-readable medium of claim 25, wherein the image capture setting comprises one of a white balance setting or an exposure setting.

28. The non-transitory computer-readable medium of claim 25, wherein the second image data has a wider field of view than the first image data.

29. The non-transitory computer-readable medium of claim 25, wherein the second image data comprises a full field of view of the image sensor.

30. The non-transitory computer-readable medium of claim 25, wherein the second portion is adjacent to the first portion.

31. The non-transitory computer-readable medium of claim 25, wherein the image capture setting comprises a white balance setting, and wherein the instructions further cause the at least one processor to:

determine that the white balance setting cannot be suitably determined for the first image data; and based on the determination that the white balance setting cannot be suitably determined for the first image data, determine the white balance setting for the first image data based on the second image data.

32. The non-transitory computer-readable medium of claim 31, wherein, to determine that the white balance setting cannot be suitably determined for the first image data, the instructions further cause the at least one processor to:

attempt to determine the white balance setting based on the first image data; and determine that a reference region cannot be found in the first image data.

* * * * *